UNITED STATES PATENT OFFICE.

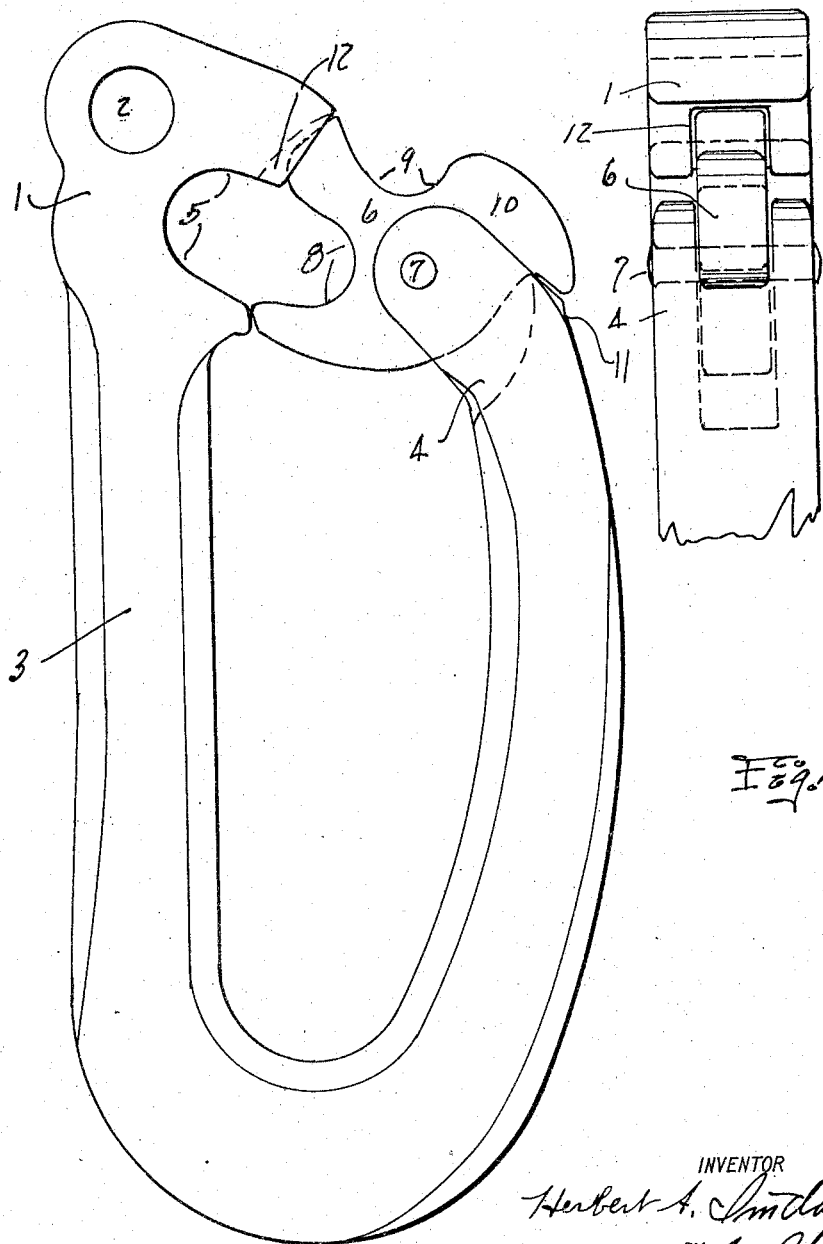

HERBERT A. SINCLAIR, OF RENTON, WASHINGTON.

SAFETY RIGGING-HOOK.

1,300,231.　　　　　　Specification of Letters Patent.　　　Patented Apr. 8, 1919.

Application filed July 23, 1917, Serial No. 182,140. Renewed October 28, 1918. Serial No. 260,061.

*To all whom it may concern:*

Be it known that I, HERBERT A. SINCLAIR, a citizen of the United States, residing at Renton, in the county of King and State of Washington, have invented certain new and useful Improvements in Safety Rigging-Hooks, of which the following is a specification.

This invention relates to improvements in safety rigging hooks and has for its principal object to provide an improved and novel type of rigging hook which embodies a two-step safety latching device which prevents the accidental removal of a line from the hook as well as preventing the hook from catching upon other lines, brush and the like. Another object of my device is to provide a hook latch which requires a pre-determined sequence of two or more operations in order to either place a line within the hook or to release the line from the hook. In logging operations and the like the usual type of open hook frequently releases the line when any slack occurs. Moreover the hook catches upon brush, stumps and the like and frequently becomes wedged full of debris which must be loosened and dug out before the line can be released. My device is designed to prevent the accidental release of the line as well as preventing the choking of the hook. Another object of my device is to provide a safety hook which is easily and cheaply manufactured, which can not readily get out of order.

Other objects will appear as my invention is more fully explained in the following specification, illustrated in the accompanying drawings and pointed out in the appended claim.

In the drawings Figure 1 is a side elevation of my improved hook. Fig. 2 is a fragmentary front elevation of same.

Referring more particularly to the drawings numeral 1 indicates the head of a hook which is provided with the usual eye 2. A straight shank 3 extends downwardly from the head 1 and after being bent into an open hook is returned in the form of a point 4. The point 4 is disposed oppositely of head 1 and is vertically slotted in a plane at right angles to the axis of the eye 2. The head 1 is provided with a notch 5 on its inner side and oppositely disposed to the slot in the point 4. A latch 6 is pivoted as at 7 within the slotted end of point 4. Latch 6 is provided with notches 8 and 9 cut in its periphery. The notch 8 is normally oppositely disposed to notch 5 while, when the latch is revolved the notch 9 is brought into register with the notch 5. A thumb lever 10 is also a part of the latch 6 and acts as a limit stop against a shoulder 11 on the point of the hook. That portion of the latch 6 which lies between the notches 8 and 9 normally fits slidably within a channel 12 in the upper portion of the head of the hook while that part of the latch on the opposite side of the notch 8 fits close to that part of the head directly below the notch 5. When in normal position as shown a line may be placed within the hook by first bringing the line into contact with the notch 9; then revolve the latch counter-clockwise until the notch 9 registers with the notch 5; next move the line into notch 5 and return the latch to normal position; next move the line into notch 8 and again rotate the latch counter-clockwise. The line will now readily release itself from notch 8 and be within the confines of the hook. The operation of removing the line from the hook is the reverse of those just described. It will be readily seen that it is almost impossible for a line to accidentally engage or disengage itself with the hook due to the definite sequence of several operations necessary to bring the line into engagement with the hook.

While I have shown a particular form of embodiment of my invention, I am aware that many minor changes therein will readily suggest themselves to others skilled in the art without departing from the spirit and scope of the invention, and I therefore desire to avoid being limited to the exact form shown and described. Having described my invention, what I claim as new and desire to protect by Letters Patent, is:—

A rigging hook comprising an elongated hook member open at one end, the end of one of the legs of the hook member having an inwardly extended projection formed in its edge with a groove, said leg having a shorter inwardly extended projection spaced from the first mentioned projection, said leg having a cable attaching opening disposed to one side of the projections and in substantial alinement with the center of the leg, the end of the other leg of the elongated member being bifurcated and bent inwardly toward and disposed between and spaced from the two projections and formed with alined openings, a latch fitted in the bifurcated portion curved end of the leg, a pivot pin extending through the openings in the bifurcated portion and the latch, said latch being formed with two spaced inwardly extended projections between which is formed a depression and on the upper edge of said latch beyond the outer projection thereon is formed a second projection, the outermost projection on the latch when in normal position fitting in the groove and the innermost projection registering with the short projection on the leg, the latch having an extension which abuts against the outer edge of the curved leg to limit the movement and hold said latch in normal position.

In testimony whereof I affix my signature.

HERBERT A. SINCLAIR.

Copies of this patent may be obtained for five cents each, by addressing the "Commissioner of Patents, Washington, D. C."